(12) United States Patent
Jung et al.

(10) Patent No.: US 8,119,833 B2
(45) Date of Patent: Feb. 21, 2012

(54) DENDRIMER SOLID ACID AND POLYMER ELECTROLYTE MEMBRANE INCLUDING THE SAME

(75) Inventors: Myung-sup Jung, Yongin-si (KR); Jin-gyu Lee, Yongin-si (KR); Sang-kook Mah, Yongin-si (KR); Jae-jun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/176,699

(22) Filed: Jul. 5, 2011

(65) Prior Publication Data

US 2011/0262833 A1    Oct. 27, 2011

Related U.S. Application Data

(62) Division of application No. 11/546,020, filed on Oct. 10, 2006.

(30) Foreign Application Priority Data

Oct. 10, 2005    (KR) .......................... 10-2005-0094934

(51) Int. Cl.
C07C 309/32 (2006.01)
C07C 309/42 (2006.01)
C07C 309/33 (2006.01)
C07C 309/44 (2006.01)
H01M 8/22 (2006.01)

(52) U.S. Cl. .......................................... 562/75; 429/506
(58) Field of Classification Search .................... 562/75; 429/506

See application file for complete search history.

(56) References Cited

U.S. PATENT DOCUMENTS

| 5,565,184 A | 10/1996 | Dunn et al. |
| 5,648,186 A | 7/1997 | Daroux et al. |
| 6,812,298 B2 | 11/2004 | Dvornic et al. |
| 2003/0035991 A1 | 2/2003 | Colombo et al. |

FOREIGN PATENT DOCUMENTS

| JP | 9-500115 | 1/1997 |
| JP | 2001-106916 | 4/2001 |
| JP | 2003-238493 | 8/2003 |
| JP | 2003-327687 | 11/2003 |
| JP | 2005-126721 | 5/2005 |
| KR | 10-2004-0097880 | 11/2004 |
| WO | WO 02/078110 A2 | 10/2002 |

OTHER PUBLICATIONS

Japanese Office action dated Sep. 15, 2009, for corresponding Japanese application 2006-276998.
KIPO Office Action for Korean Priority Patent Application No. 10-2005-0094934, dated Sep. 28, 2006, 3 pages.
SIPO Office Action (and English translation) dated Nov. 3, 2011, for corresponding Chinese Patent Application No. 200610142353.0, 7 pages.

*Primary Examiner* — Peter O Sullivan
(74) *Attorney, Agent, or Firm* — Christie, Parker & Hale, LLP

(57) ABSTRACT

Provided are a dendrimer solid acid and a polymer electrolyte membrane using the same. The polymer electrolyte membrane includes a macromolecule of a dendrimer solid acid having ionically conductive terminal groups at the surface thereof and a minimum amount of ionically conductive terminal groups required for ionic conduction, thus suppressing swelling and allowing a uniform distribution of the dendrimer solid acid, thereby improving ionic conductivity. Since the number of ionically conductive terminal groups in the polymer electrolyte membrane is minimized and the polymer matrix in which swelling is suppressed is used, methanol crossover and difficulties of outflow due to a large volume may be reduced, and a macromolecule of the dendrimer solid acid having the ionically conductive terminal groups on the surface thereof is uniformly distributed. Accordingly, ionic conductivity is high and thus, the polymer electrolyte membrane shows good ionic conductivity even in non-humidified conditions.

10 Claims, 4 Drawing Sheets

DENDRIMER SOLID ACID AND POLYMER ELECTROLYTE MEMBRANE INCLUDING THE SAME

CROSS-REFERENCE TO RELATED PATENT APPLICATION

This application is a divisional of U.S. patent application Ser. No. 11/546,020, filed Oct. 10, 2006, which claims priority to and the benefit of Korean Patent Application No. 10-2005-0094934, filed on Oct. 10, 2005, in the Korean Intellectual Property Office, the disclosures of both of which are incorporated herein in their entirety by reference.

BACKGROUND

1. Field of the Invention

The present invention relates to a dendrimer solid acid and a polymer electrolyte membrane using the same, and more particularly, to a dendrimer solid acid which provides high ionic conductivity and a polymer electrolyte membrane with excellent ionic conductivity and low methanol crossover.

2. Description of the Related Art

A fuel cell is an electrochemical device which directly transforms chemical energy of oxygen and hydrogen contained in a hydrocarbon material such as methanol, ethanol, or natural gas into electric energy.

Fuel cells can be classified into Phosphoric Acid Fuel Cells (PAFC), Molten Carbonate Fuel Cells (MCFC), Solid Oxide Full Cells (SOFC), Polymer Electrolyte Membrane Fuel Cells (PEMFC), and Alkaline Full Cells (AFC) according to the type of electrolyte used. All fuel cells operate on the same general principles, but may differ in the type of fuel used, the operating temperature, the catalyst used or the electrolyte used. In particular, a PEMFC can be used in small-sized stationary power generation equipment or a transportation system due to its low operating temperature, high output density, rapid start-up, and prompt response to the variation of output demand.

The core part of a PEMFC is a Membrane Electrode Assembly, MEA. An MEA generally comprises a polymer electrolyte membrane and two electrodes on opposite sides of the polymer electrolyte membrane which independently act as a cathode and an anode.

The polymer electrolyte membrane acts as a separator, blocking direct contact between an oxidizing agent and a reducing agent, and electrically insulates the two electrodes while conducting protons. Accordingly, a good polymer electrolyte membrane has high proton conductivity, good electrical insulation, low reactant permeability, excellent thermal, chemical and mechanical stability under normal conditions of fuel cell operation, and a reasonable price.

In order to meet these requirements, various types of polymer electrolyte membranes have been developed, and, in particular, a highly fluorinated polysulfonic acid membrane such as a NAFION™ membrane has been shown to exhibit good durability and performance. However, a NAFION™ membrane should be sufficiently humidified, and to prevent moisture loss, the NAFION™ membrane should be used at a temperature of 80° C. or below. Also, since, a carbon-carbon bond of a main chain is attacked by oxygen ($O_2$), a NAFION™ membrane may not be stable under the operating conditions of a fuel cell.

Moreover, in a Direct Methanol Fuel Cell (DMFC), an aqueous methanol solution is supplied as a fuel to the anode and a portion of unreacted aqueous methanol solution permeates the polymer electrolyte membrane. The methanol solution that permeates the polymer electrolyte membrane causes a swelling phenomenon in an electrolyte membrane and diffuses to a cathode catalyst layer. Such a phenomenon is referred to as "methanol crossover," and can lead to the direct oxidization of methanol at the cathode where an electrochemical reduction of hydrogen ions and oxygen occurs, and thus the methanol crossover results in a drop in the electric potential of the cathode, thereby causing a significant decline in the performance of the fuel cell.

This same fuel crossover problem may also arise with other fuel cells using a liquid polar organic fuel other than methanol.

SUMMARY OF THE INVENTION

According to one embodiment of the present invention, a dendrimer solid acid is provided which can provide ionic conductivity to a polymer electrolyte membrane while not separating easily from the polymer electrolyte membrane.

According to another embodiment of the present invention, a polymer electrolyte membrane is provided which includes a dendrimer solid acid which shows excellent ionic conductivity, even without humidifying, and low methanol crossover.

According to another embodiment of the present invention, a Membrane Electrode Assembly (MEA) is provided that includes an improved polymer electrolyte membrane.

According to another embodiment of the present invention, a fuel cell is provided including an improved polymer electrolyte membrane.

According to an embodiment of the present invention, a dendrimer solid acid of Formula 1 is provided:

$$X{-}[E_1{-}\ldots{-}E_i{-}\ldots{-}E_n]_a \qquad \text{Formula 1}$$

where X is a core represented by one of Formula 2 through Formula 17:

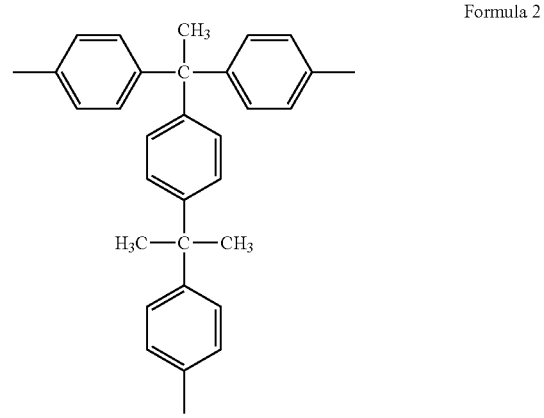

Formula 2

Formula 3

Formula 4
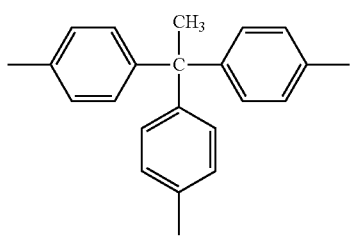

Formula 5
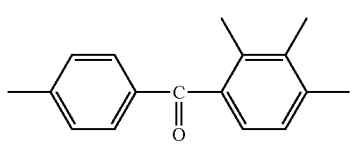

Formula 6
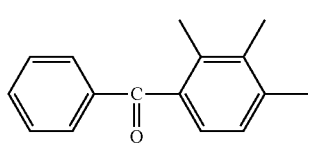

Formula 7
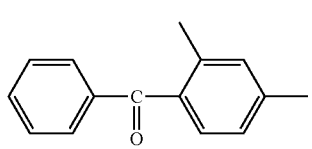

Formula 8
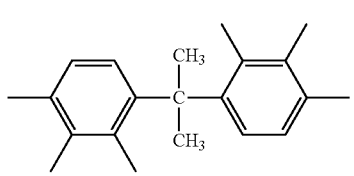

Formula 9
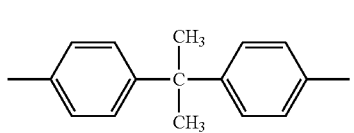

Formula 10
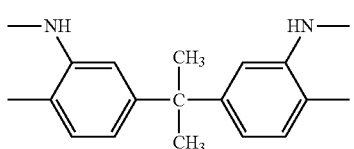

Formula 11
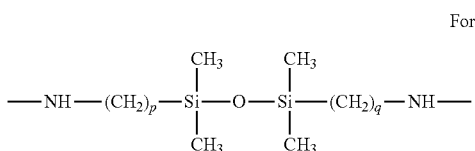

where each of p and q is independently an integer from 1 to 9,

Formula 12
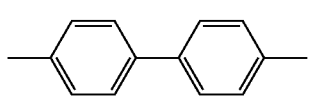

Formula 13
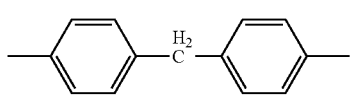

Formula 14
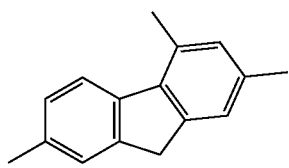

Formula 15
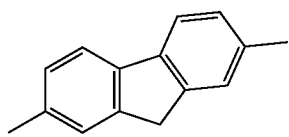

Formula 16
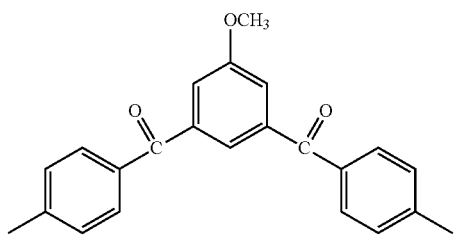

Formula 17
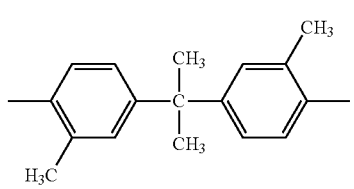

where a is an integer from 1 to 6 corresponding to the number of bonding sites of X, n is an integer from 2 to 6 corresponding to the number of generations of branching units in the dendrimer, each of $E_1$ through $E_{n-1}$ is an organic group independently selected from the organic groups represented by Formula 18 through Formula 22:

Formula 18
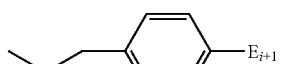

Formula 19
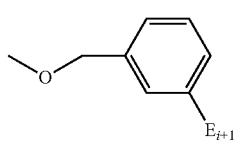

Formula 20
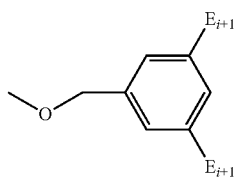

Formula 21
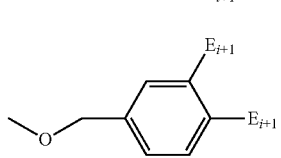

-continued

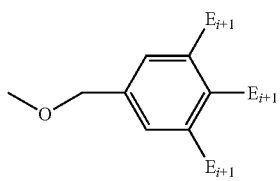

Formula 22 and $E_n$ is H, —OH, —COOH, —SO$_3$H, or —OPO(OH)$_2$.

According to another embodiment of the present invention, a polymer electrolyte membrane is provided that includes at least one polymer matrix having an end group selected from the group consisting of —SO$_3$H, —COOH, —OH, and —OPO(OH)$_2$ at the terminal of a side chain, with a dendrimer solid acid as set forth above uniformly distributed through the polymer matrix.

According to another embodiment of the present invention, a Membrane Electrode Assembly (MEA) is provided including: an improved electrolyte membrane including a polymer electrolyte membrane as set forth above; a cathode on one side of the Membrane Electrode Assembly having a catalyst layer and a diffusion layer; and an anode on the other side of the Membrane Electrode Assembly having a catalyst layer and a diffusion layer.

According to another embodiment of the present invention, a fuel cell is provided including an improved Membrane Electrode Assembly (MEA) as set forth above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
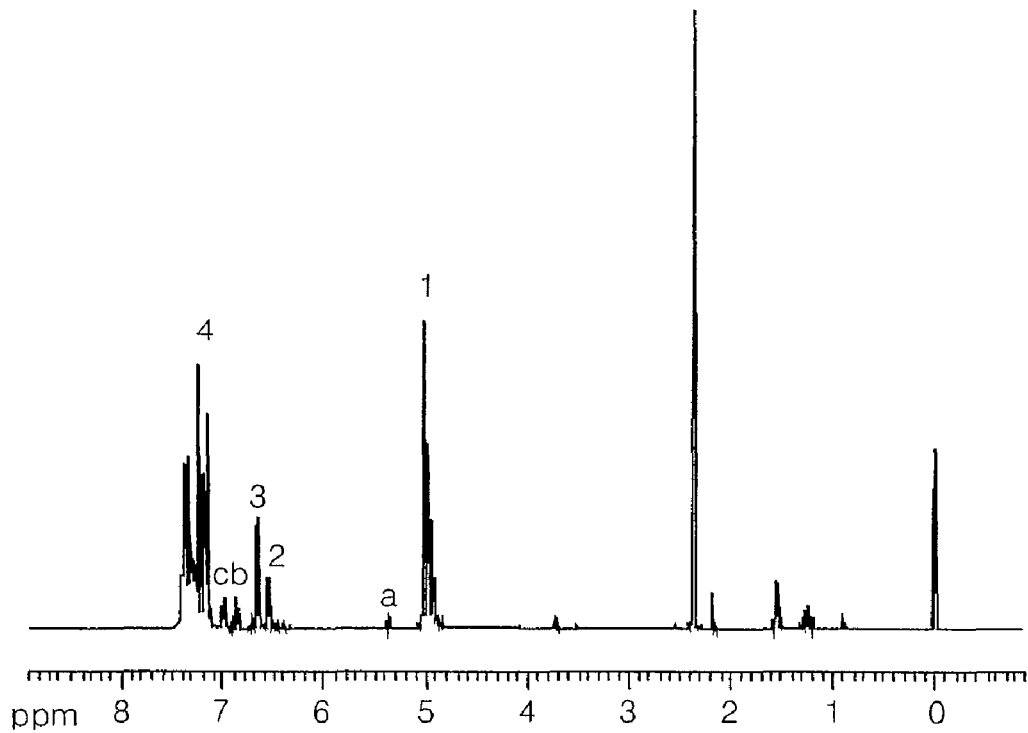
FIG. 1 is a graph showing the results of a Nuclear Magnetic Resonance (NMR) analysis performed to identify the structure of a precursor of a dendrimer solid acid according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

A dendrimer solid acid according to an embodiment of the present invention is represented by Formula 1 below.

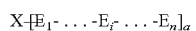

Formula 1 where X is a core represented by one of Formula 2 through Formula 17,

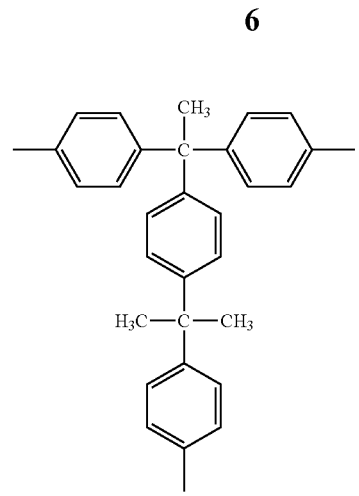

Formula 2

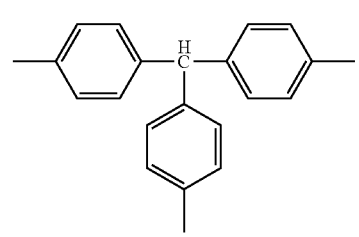

Formula 3

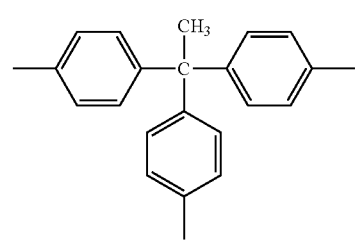

Formula 4

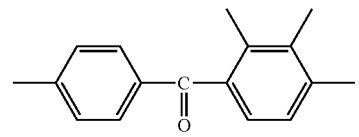

Formula 5

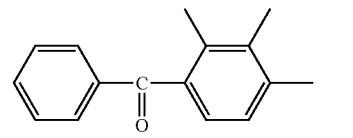

Formula 6

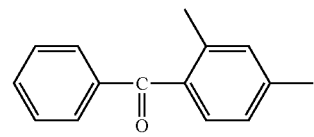

Formula 7

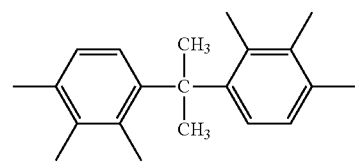

Formula 8

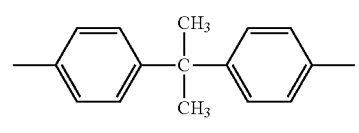

Formula 9

-continued

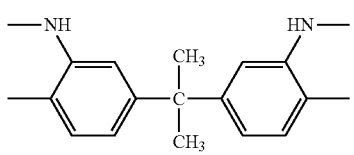
Formula 10

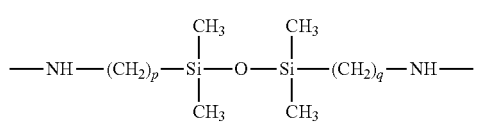
Formula 11 where each of p and q is independently an integer from 1 to 9,

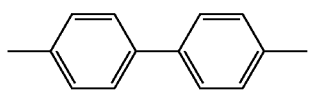
Formula 12

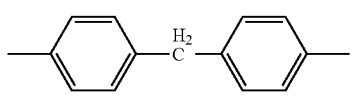
Formula 13

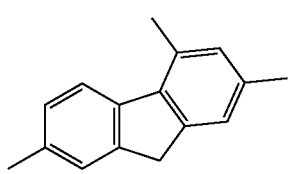
Formula 14

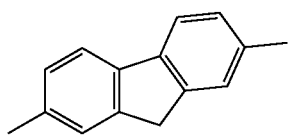
Formula 15

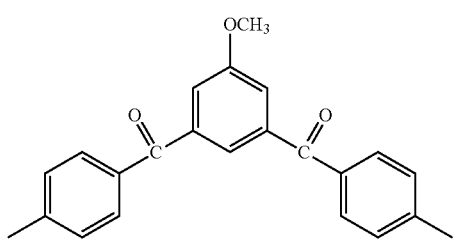
Formula 16

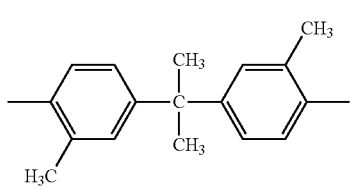
Formula 17 where a is an integer from 1 to 6 corresponding to the number of bonding sites of X, n is an integer from 2 to 6 corresponding to the number of generations of branching units of the dendrimer, each of $E_1$ through $E_{n-1}$ is an organic group independently selected from the organic groups represented by Formula 18 through Formula 22:

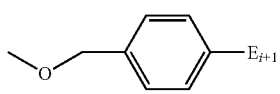
Formula 18

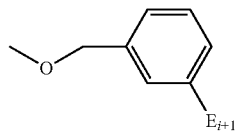
Formula 19

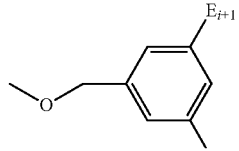
Formula 20

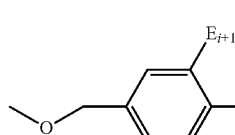
Formula 21

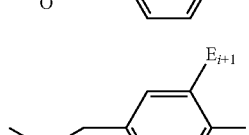
Formula 22

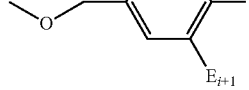

and $E_n$ is H, —OH, —COOH, —SO$_3$H, or —OPO(OH)$_2$.

The term "dendrimer" refers to a single macromolecule having a branched shape which is well arranged so as to be substantially two-dimensionally or three-dimensionally symmetrical. Certain dendrimers can be classified as cone or sphere forms. A dendrimer is similar to a polymer in that both have large molecules with a large molecular weight, but unlike a general polymer having a linear shape, a dendrimer has a symmetrical ring shape and is formed of a single macromolecule having no distribution of molecular weight. The dendrimer has characteristics of both a monomer and a polymer, and thus can have various applications.

It should be apparent to one of skill in the art that the individual branches of the dendrimer of Formula 1 are not limited to straight chain branches, but rather, each branch may have further branches depending on the number of $E_{i+1}$ bonding sites for a particular $E_i$ organic group at the $i^{th}$ level of the dendrimer.

In addition, the structure of the dendrimer can be formed by a synthesis method, for example, a convergent or divergent method. A center portion of the dendrimer is blocked from the outside or is nearly isolated, and thus, various metallic ions or unique functional groups can be protected. Also, the surface of the dendrimer is three dimensional and large so as to be useful for diverse purposes.

If the dendrimer solid acid according to an embodiment of the present invention is distributed between polymer matrixes, an outflow due to swelling hardly occurs because the dendrimer solid acid has a significantly large size. Also, the dendrimer solid acid according to an embodiment of the present invention provides ionic conductivity to a polymer electrolyte membrane since acidic functional groups such as —COOH, —SO$_3$H, or —OPO(OH)$_2$ are attached to terminal ends providing high ionic conductivity.

A dendrimer solid acid according to an embodiment of the present invention may be a compound represented by one of Formulas 23 through 26.

Formula 23
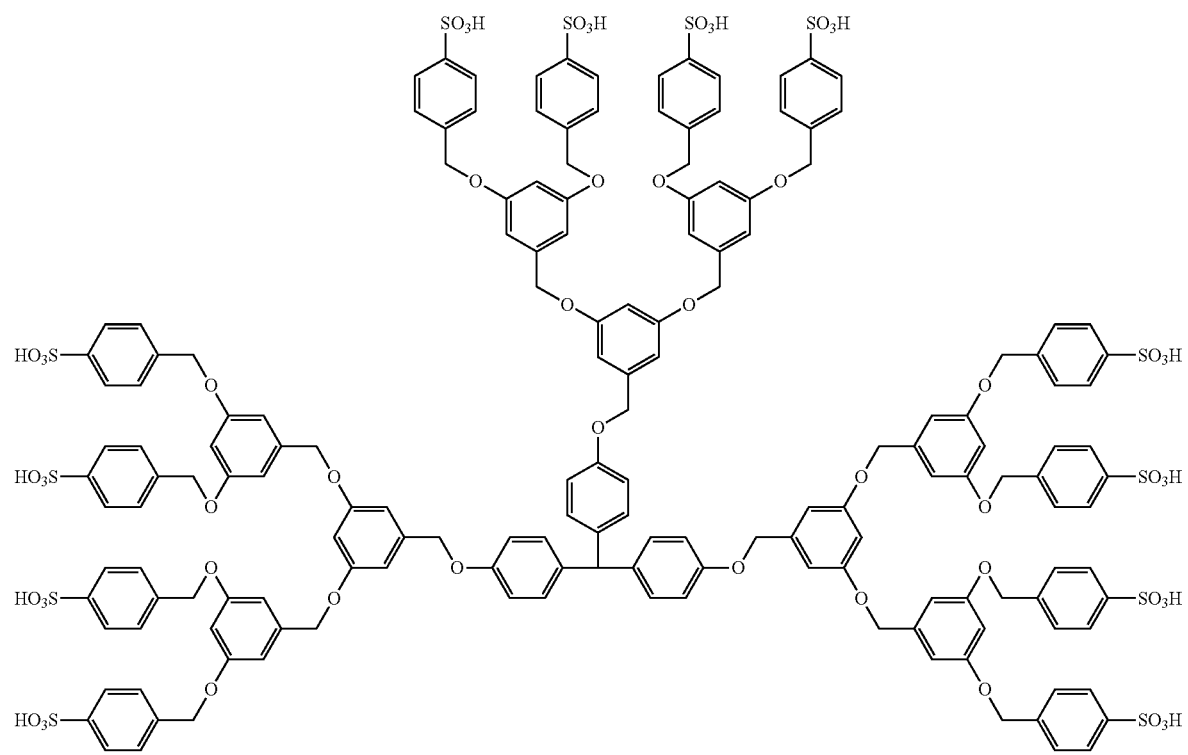
Formula 24
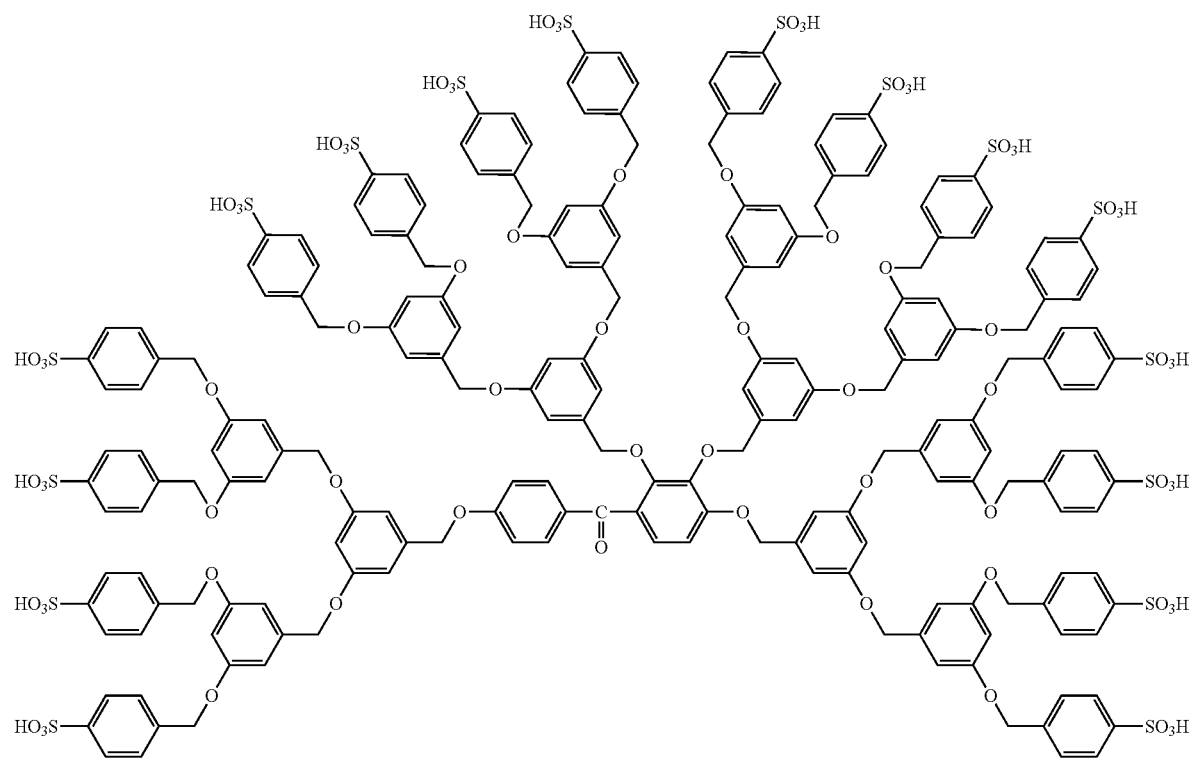

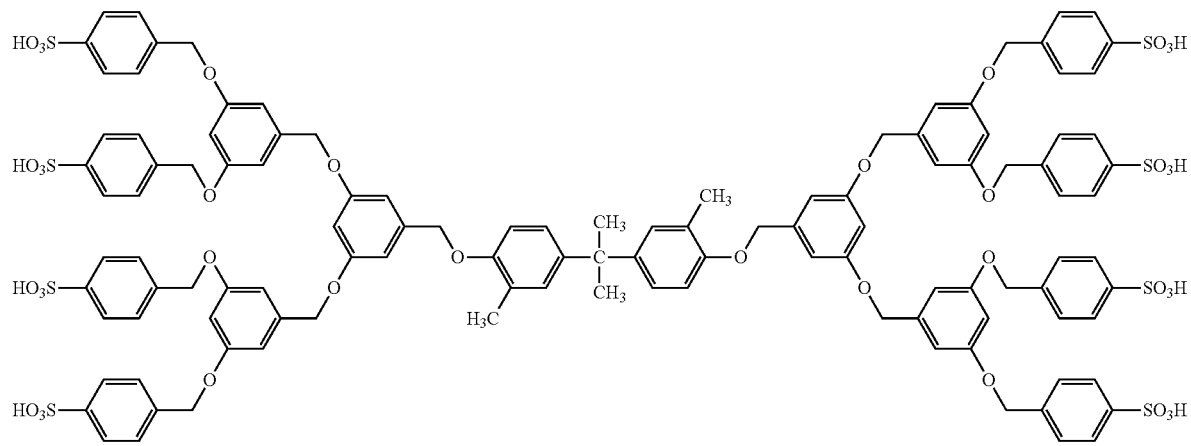

Formula 25

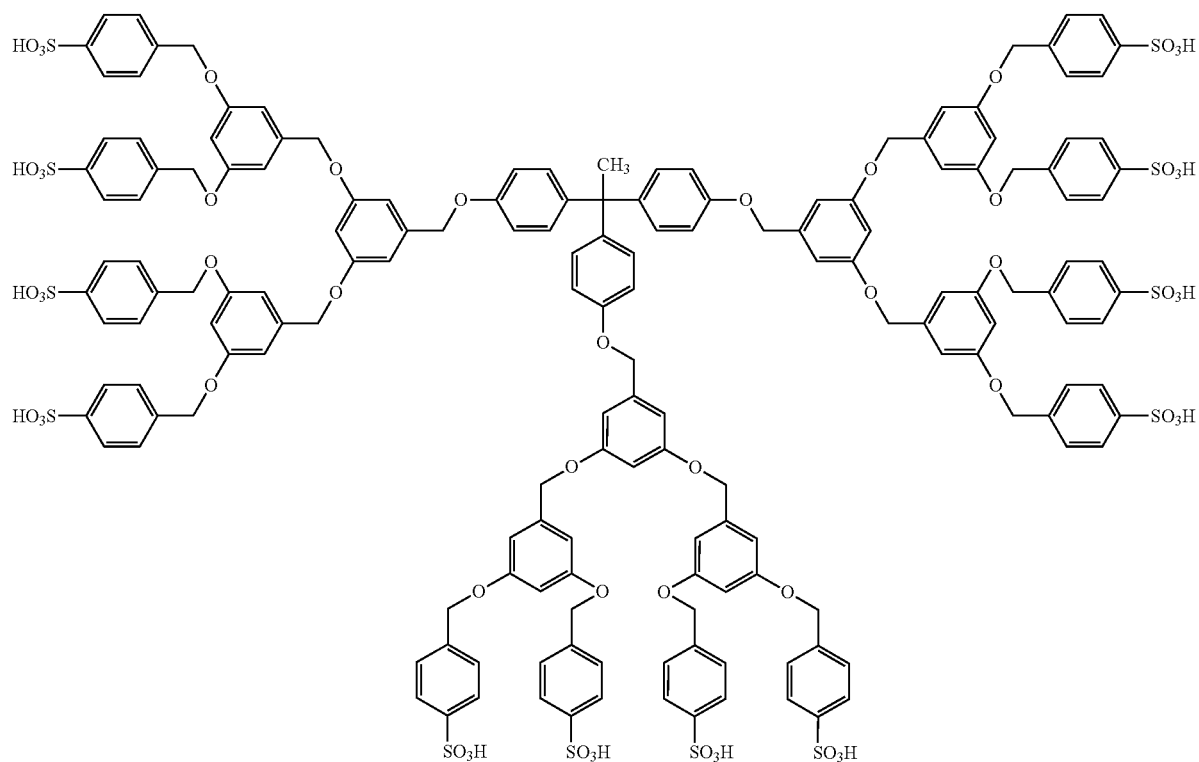

Formula 26

Hereinafter, the dendrimer solid acid according to an embodiment of the present invention will be described in greater detail with reference to a process of manufacturing the dendrimer solid acid represented by Reaction Schemes 1, 2 and 3. The method is provided to facilitate the understanding of the present invention, but the present invention is not limited by the reaction schemes set forth herein.

First, as shown in Reaction scheme 1, one generation of a repeating unit is synthesized.

Reaction Scheme 1

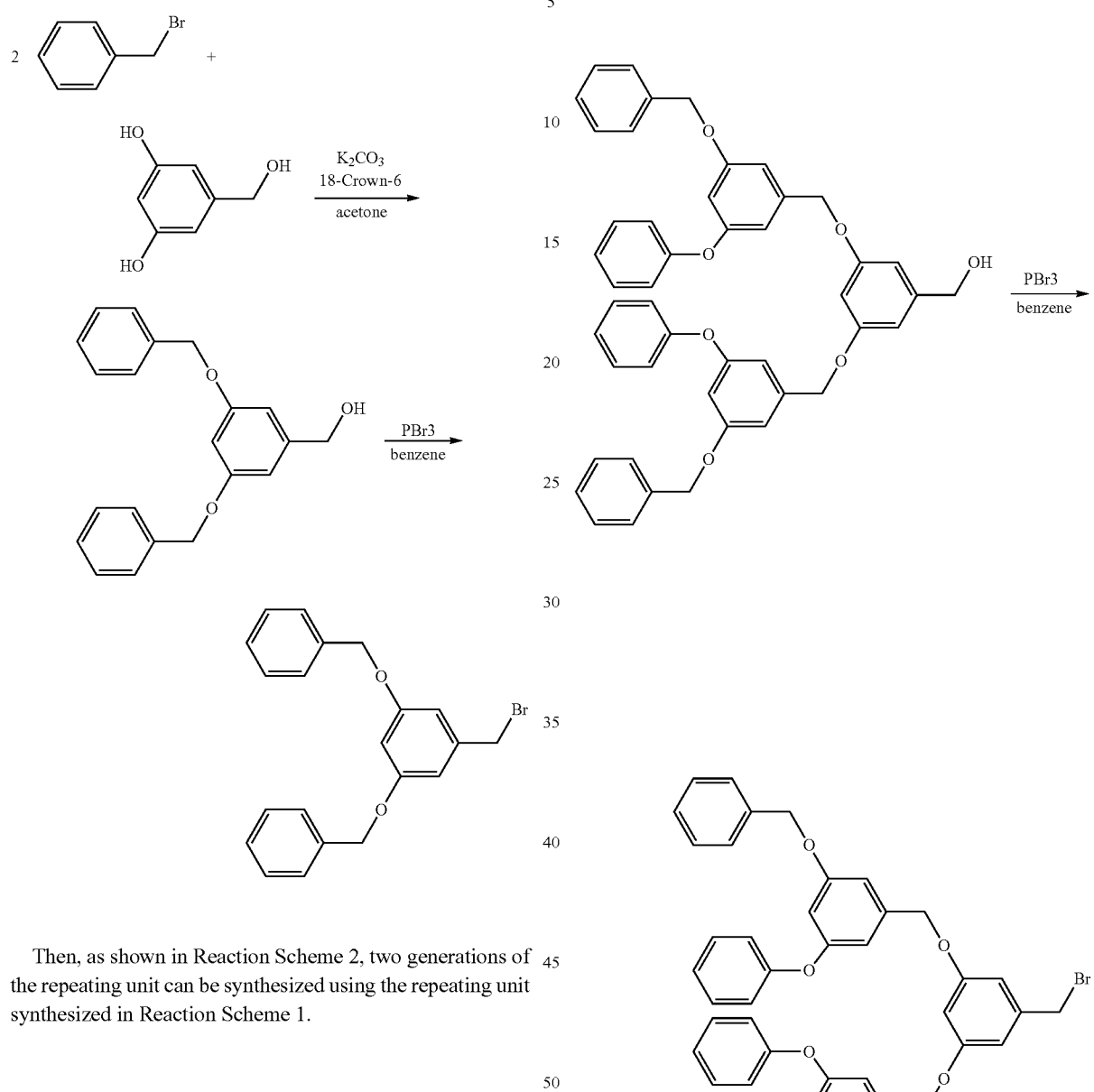

Then, as shown in Reaction Scheme 2, two generations of the repeating unit can be synthesized using the repeating unit synthesized in Reaction Scheme 1.

Reaction Scheme 2

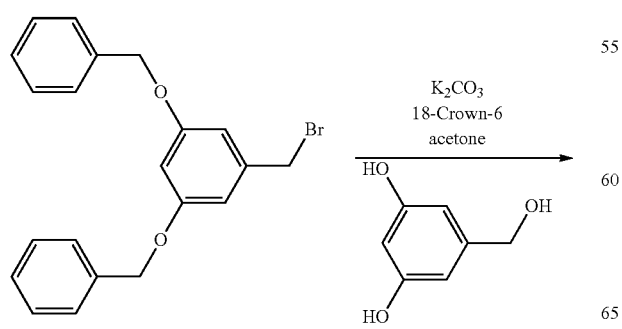

As shown in Reaction Scheme 3, the two generations of the repeating unit manufactured in Reaction Scheme 2 are reacted with a core material below to manufacture a solid acid precursor.

Reaction Scheme 3

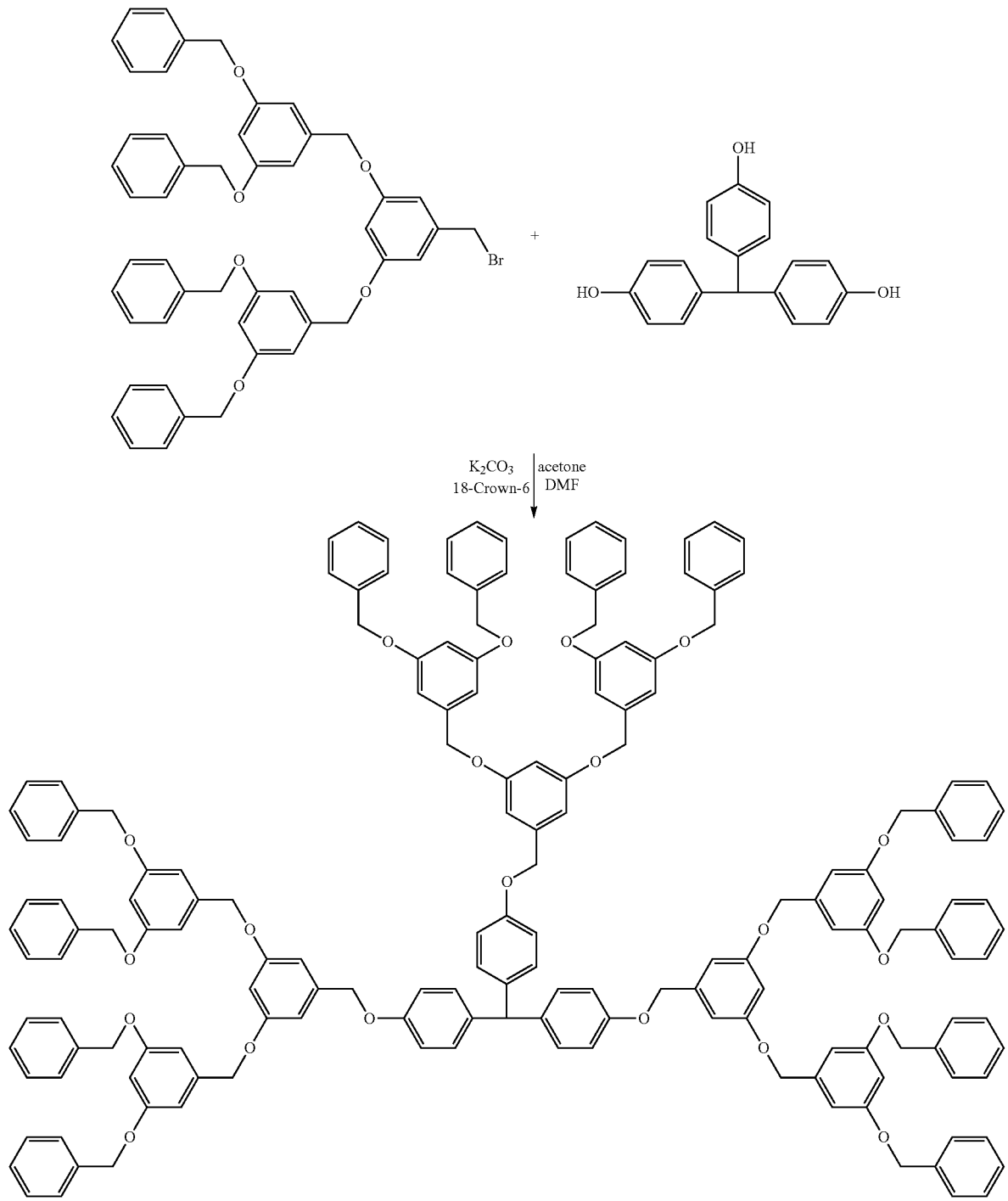

The solid acid precursor manufactured as described above reacts with sulfuric acid and fumed sulfuric acid to produce the dendrimer solid acid represented by Formula 24. In order to increase the number of generations of the repeating unit, the process shown in Reaction Scheme 2 may be repeated.

Moreover, in order to have a functional group such as —COOH, —OH, or —OPO(OH)$_2$ at the terminal of the dendrimer solid acid, a method of introducing an acid functional group such as —SO$_3$H after manufacturing the dendrimer is not appropriate. Instead, a structure in which a functional group such as —COOH, —OH, or —OPO(OH)$_2$ is protected by an alkyl group when synthesizing the first generation of repeating unit is obtained. That is, the functional group is included in a benzyl halide compound having a structure of —COOR, —OR, or —OPO(OR)$_2$. The final dendrimer having the structure with the plurality of generations of the repeating unit is prepared and then the dendrimer solid acid can be manufactured by detaching an alkyl group. Here, R is, for example, a monovalent $C_{1-5}$ alkyl group.

A polymer electrolyte membrane according to an embodiment of the present invention will now be described.

A polymer electrolyte membrane according to an embodiment of the present invention includes at least one polymer matrix having an end group selected from the group consisting of —$SO_3H$, —COOH, —OH, and —$OPO(OH)_2$ at the terminal of a side chain and a dendrimer solid acid uniformly distributed through the polymer matrixes.

The polymer matrix may be a polymer material such as polyimide, polybenzimidazole, polyethersulfone, or polyether-ether-ketone.

The polymer electrolyte membrane according to an embodiment of the present invention has good ionic conductivity since the dendrimer solid acid according to an embodiment of the present invention is uniformly distributed throughout the polymer matrix. That is, acidic functional groups at the terminal of the side chain of the polymer matrix and acidic functional groups on the surface of the dendrimer solid acid interact together to provide high ionic conductivity.

Conventionally, a large amount of ionically conductive terminal groups such as sulfone groups are attached to a polymer in a conventional polymer electrolyte membrane, but such a configuration may cause swelling. However, in certain polymer matrixes according to the present invention, a smaller amount of ionically conductive terminal groups are required for ionic conduction, thereby reducing swelling caused by moisture.

In particular, the polymer matrix herein may be a polymer resin represented by Formula 27 below:

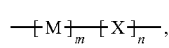

Formula 27 where M is a repeating unit of Formula 28 below,

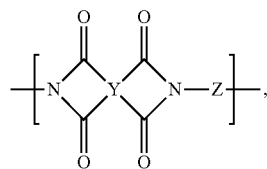

Formula 28 where Y is a tetravalent aromatic organic group or aliphatic organic group, and Z is a bivalent aromatic organic group or aliphatic organic group; and X of Formula 27 is a repeating unit of Formula 29 below,

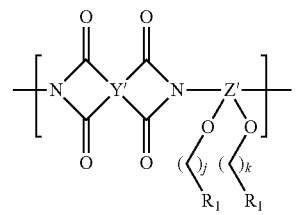

Formula 29 where Y' is a tetravalent aromatic organic group or aliphatic organic group, Z' is a tetravalent aromatic organic group or aliphatic organic group, each of j and k is independently an integer from 1 to 6, and $R_1$ is one of —OH, —$SO_3H$, —COOH, and —$OPO(OH)_2$.

In addition, m and n are each independently in the range of 30 to 5000, where the ratio of m to n is between 2:8 and 8:2, for example, between 3:7 and 7:3, and preferably between 4:6 and 6:4. When the ratio of m to n is less than 2:8, swelling and methanol crossover due to water are increased. When the ratio of m to n is greater than 8:2, hydrogen ion conductivity is too low to secure an optimum level of hydrogen ion conductivity even when the solid acid is added.

For example, M and X, which are repeating units of the polymer resin in Formula 27, may have the structures represented by Formula 30 and Formula 31, respectively:

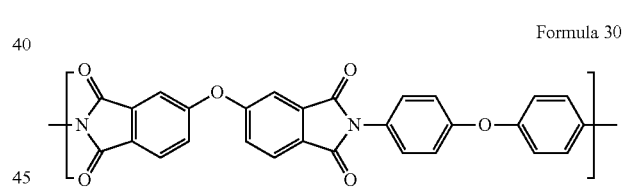

Formula 30

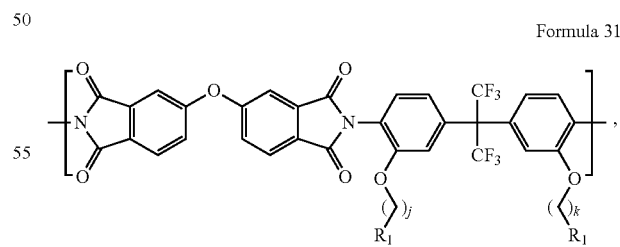

Formula 31 where $R_1$, j and k are defined as in Formula 29.

The process of manufacturing the polymer matrix according to Formula 27 is not particularly restricted, and may be processed illustrated in Reaction Scheme 4.

Reaction Scheme 4
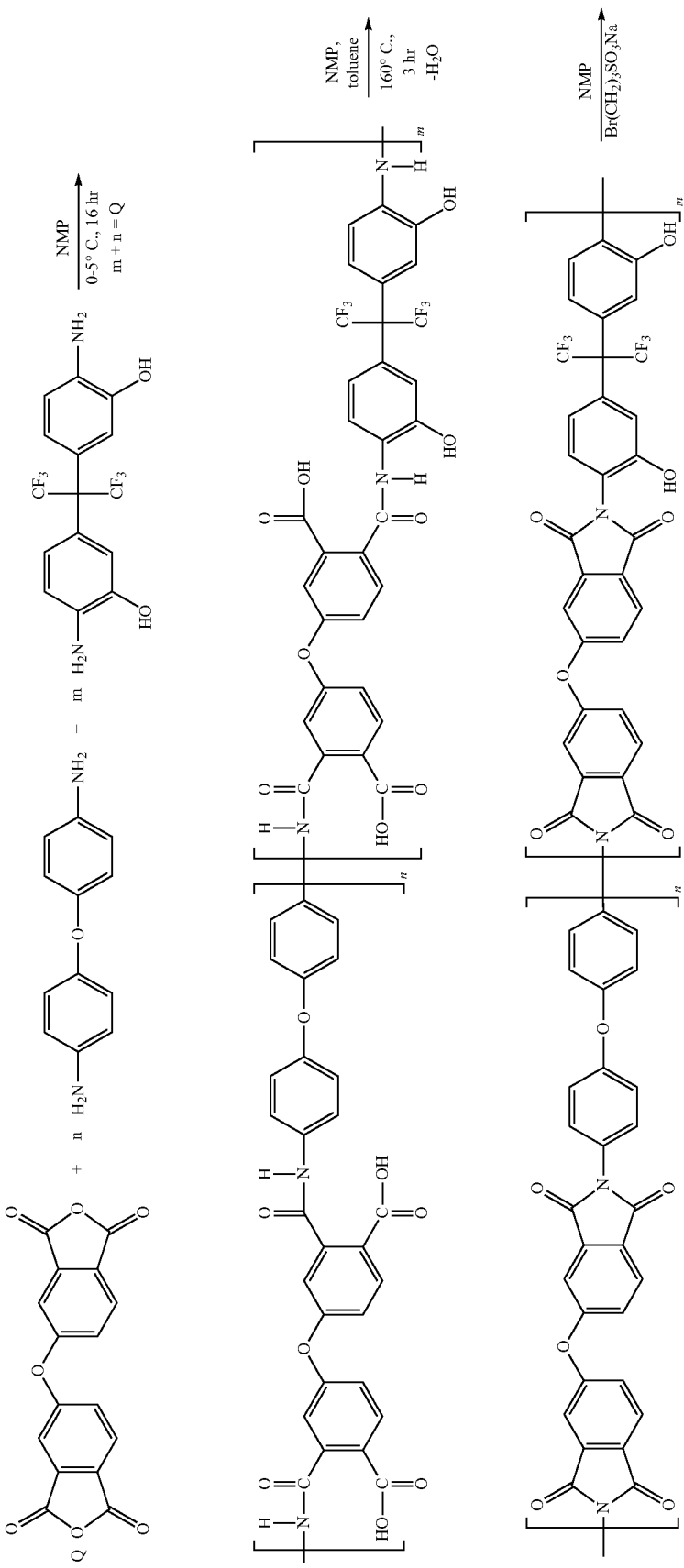

-continued
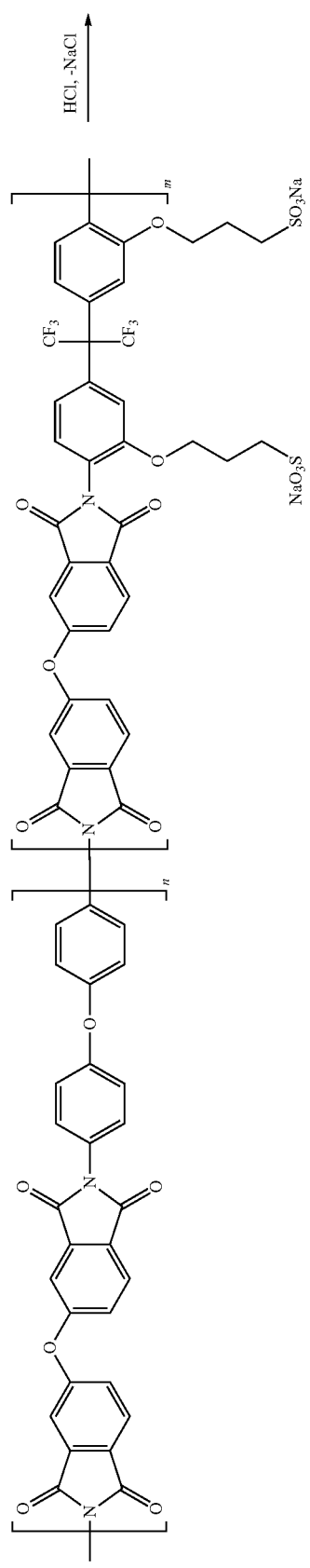
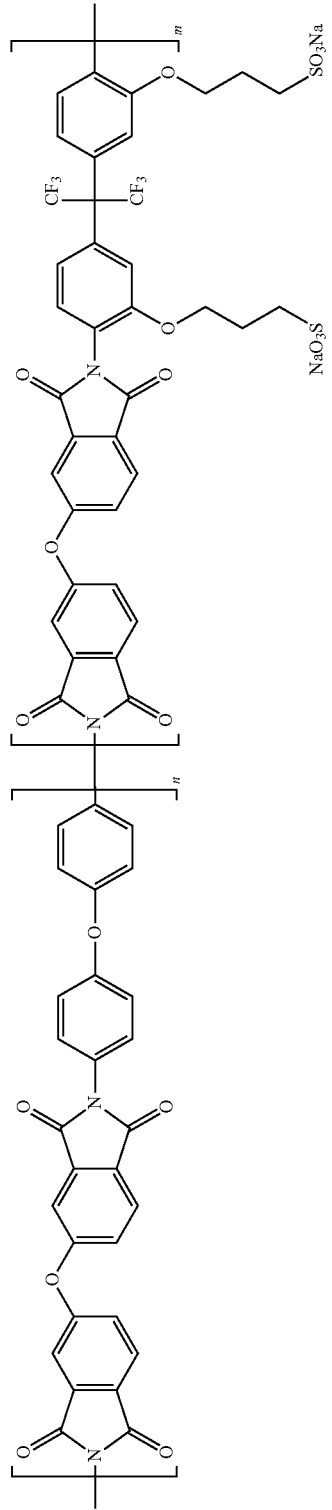

Figure 3:
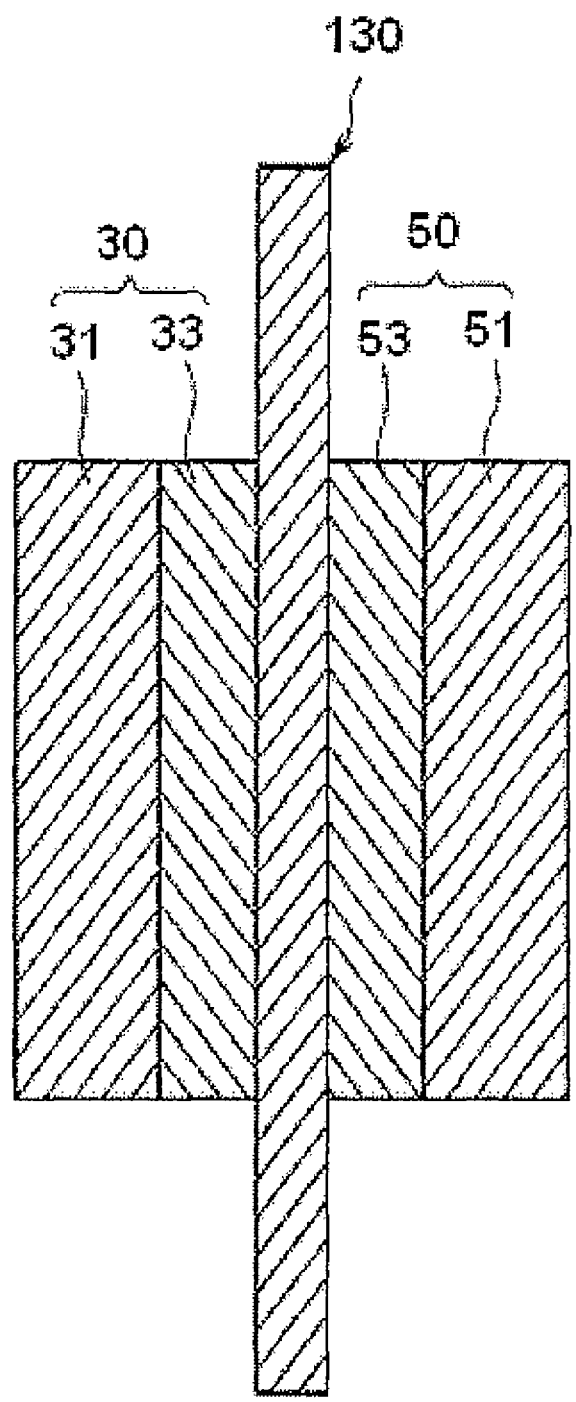
FIG. 3 is a schematic illustration of a Membrane Electrode Assembly (MEA) according to an embodiment of the invention.

A Membrane Electrode Assembly (MEA) including the polymer electrolyte membrane according to an embodiment of the present invention will now be described with reference to FIG. 3. The MEA includes: an electrolyte membrane 130 including a polymer electrolyte membrane according to an embodiment of the present invention; a cathode 50 on one side of the electrolyte membrane 130 having a catalyst layer 53 and a diffusion layer 51, and an anode 30 on the other side of the electrolyte membrane 130 having a catalyst layer 33 and a diffusion layer 31. Cathodes and anodes, each having a catalyst layer and a diffusion layer are well known in the field of fuel cells. The polymer electrolyte membrane according to an embodiment of the present invention can be used independently as an electrolyte membrane or can be combined with another membrane having ionic conductivity.

A fuel cell including the polymer electrolyte membrane will now be described.

The fuel cell includes: an electrolyte membrane including the polymer electrolyte membrane according to an embodiment of the present invention as described above; a cathode on one side of the electrolyte membrane having a catalyst layer and a diffusion layer; and an anode on the other side of the electrolyte membrane having a catalyst layer and a diffusion layer. Each of the cathode and anode has a catalyst layer and a diffusion layer as is well known in the field of fuel cells. The polymer electrolyte membrane according to an embodiment of the present invention can be used independently as an electrolyte membrane or can be combined with another membrane having ionic conductivity.

Figure 4:
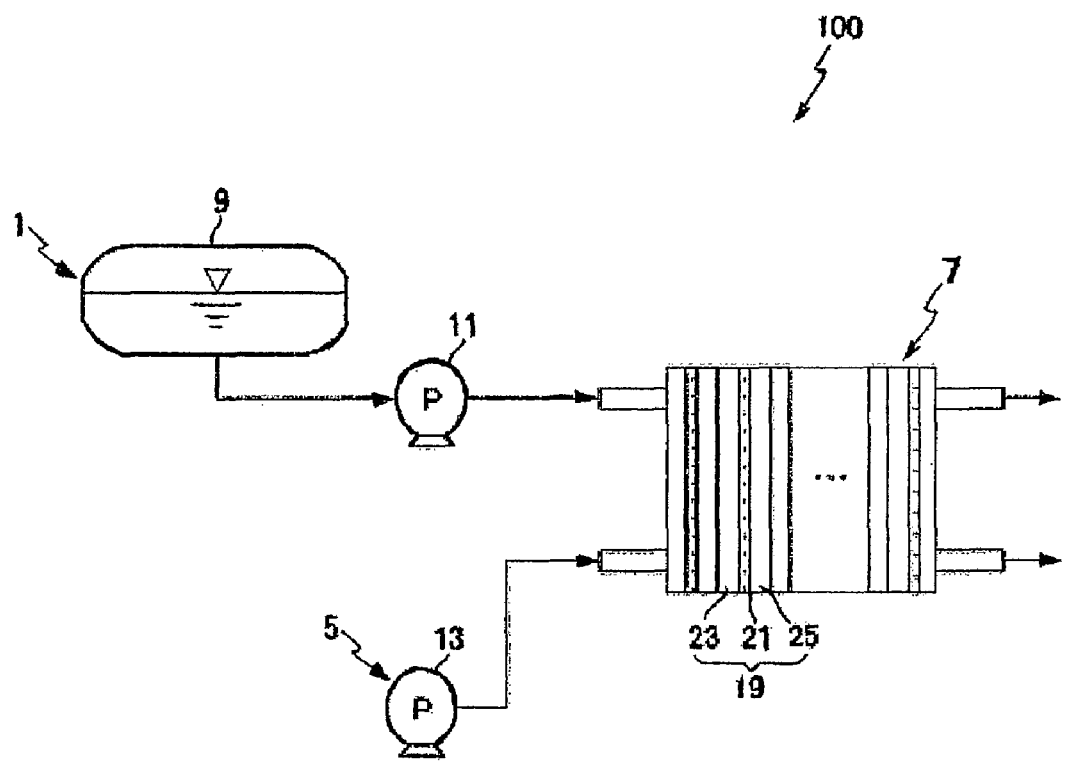
FIG. 4 is a schematic illustration of a fuel cell system according to an embodiment of the invention.

A representative fuel cell system according to an embodiment of the invention is shown in FIG. 4. The fuel cell system 100 includes a fuel supplier 1, an oxygen supplier 5, and a fuel cell stack 7. The fuel supplier 1 includes a fuel tank 9 for containing a fuel such as methanol and a fuel pump 11 for supplying the fuel to the stack 7. The oxygen supplier 5 includes an air pump 13 for supplying oxygen from air to the stack 7. The stack includes a plurality of electricity generating units 19, each comprising a Membrane Electrode Assembly 21 and separators 23 and 25. Each Membrane Electrode Assembly 21 comprises a polymer electrode member with an anode on a first side and a cathode on a second side. To manufacture the fuel cell, a conventional method can be used, and thus, a detailed description is omitted herein.

The polymer electrolyte membrane according to an embodiment of the present invention uses a minimal number of ionically conductive terminal groups required for ionic conduction, and uses a polymer matrix in which swelling is suppressed without a significant effect on methanol crossover and the difficulties of outflow caused by a large number of ionically conductive terminal groups while uniformly distributing a large sized dendrimer solid acid having ionically conductive terminal groups on the surface of the dendrimer solid acid. Accordingly, ionic conductivity is greatly improved, and thus, polymer electrolyte membranes according to certain embodiments of the present invention show good ionic conductivity, even in non-humidified conditions.

The present invention will be described in greater detail with reference to the following examples. The following examples are for illustrative purposes only, and are not intended to limit the scope of the invention.

Example 1

Manufacturing the Compound of Formula 23

0.01 moles of 1,1,1-tri(4-hydroxyphenyl)-methane, 0.033 moles of a repeating unit manufactured according to Reaction Scheme 2, 0.033 moles of $K_2CO_3$, and 9 mmol of 18-crown-6 were dissolved in acetone contained in a 3 neck reaction flask equipped with a mixer under a nitrogen atmosphere, and reacted for 16 hours at 60° C. When the reaction was complete, acetone was removed with an evaporator and the resulting product was dissolved again in ethylacetate.

Then, unreactive hydroxy compounds were extracted with a separating funnel using a NaOH aqueous solution, moisture was removed using $MgSO_4$ from an ethylacetate solution in which the product was dissolved, and the solvent was removed by evaporating. Then, the product was column refined using toluene to obtain a solid acid precursor of Formula 32. The structure of the solid acid precursor was identified using Nuclear Magnetic Resonance (NMR) analysis, and the results are shown in FIG. 1.

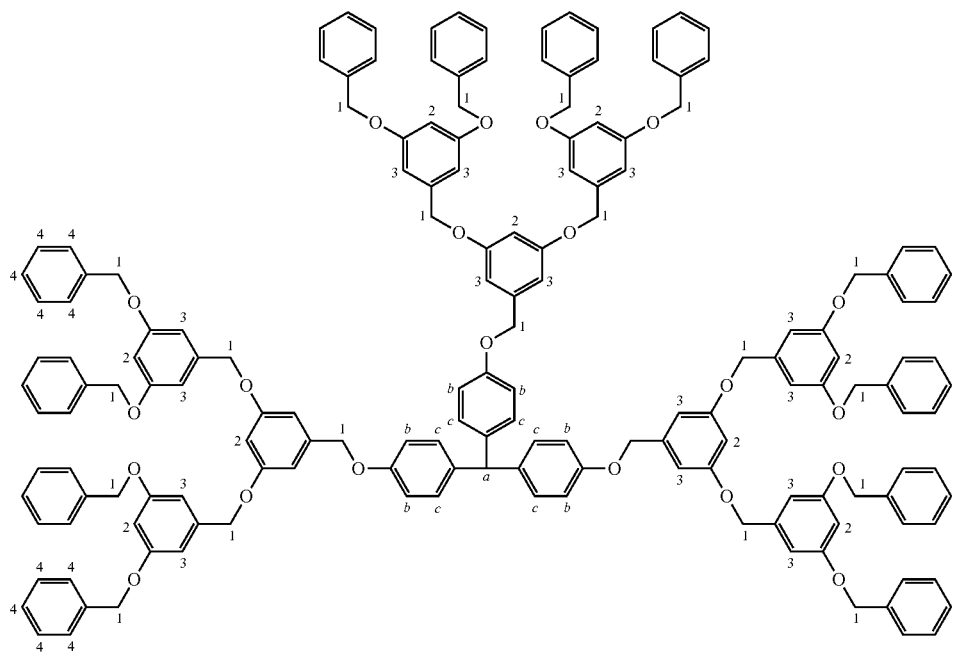

Formula 32

Figure 2:
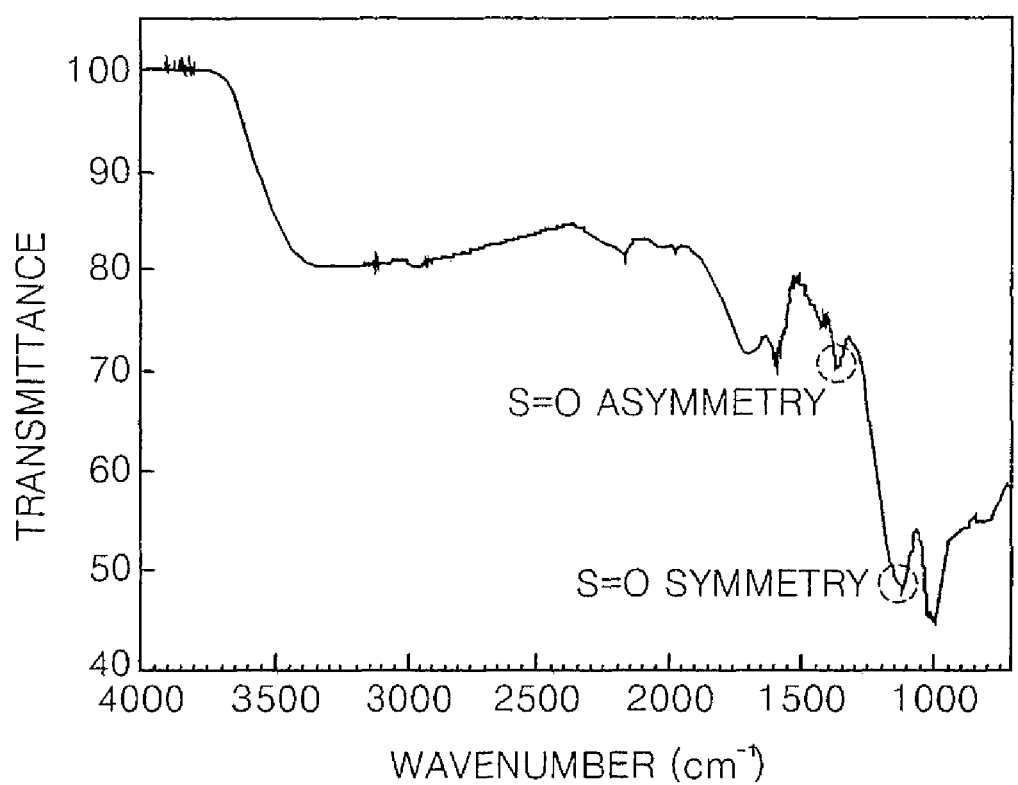
FIG. 2 is a graph showing the results of a Fourier Transform Infrared Spectroscopy (FT-IR) analysis performed to identify the structure of a dendrimer solid acid according to an embodiment of the present invention.

Then 5 g of the dendrimer solid acid precursor of Formula 32 was completely dissolved in 15 ml of sulfuric acid, and 5 ml of fumed sulfuric acid ($SO_3$ 60%) was added thereto. The mixture was reacted at 80° C. for 12 hours and precipitated in ether. The precipitate was filtered and then dissolved in water. The product was put into a dialysis membrane and refined to obtain the compound of Formula 23. The structure of the compound of Formula 23 was identified using Fourier Transform Infrared Spectroscopy (FT-IR) analysis, and the results are shown in FIG. 2.

Example 2

Manufacturing the Compound of Formula 24

The compound of Formula 24 was manufactured in the same manner as the compound of Formula 23 in Example 1, except that (4-hydroxyphenyl)-(2,3,4-trihydroxyphenyl) methanone was used instead of 1,1,1-tri(4-hydroxyphenyl)-methane.

Example 3

Manufacturing the Compound of Formula 25

The compound of Formula 25 was manufactured in the same manner as the compound of Formula 23 in Example 1, except that 2,2-bis(4-hydroxy-3-methyl phenyl)propane was used instead of 1,1,1-tri(4-hydroxyphenyl)-methane.

Example 4

Manufacturing the Compound of Formula 26

The compound of Formula 26 was manufactured in the same manner as the compound of Formula 23 in Example 1, except that 1,1,1-tri(4-hydroxyphenyl)-ethane was used instead of 1,1,1-tri(4-hydroxyphenyl)-methane.

Example 5

100 parts by weight of the polymer matrix of Formula 27 (M: Formula 30, N: Formula 31), the ratio of m to n being 5:5, and 10 parts by weight of the dendrimer solid acid of Formula 23 were completely dissolved in N-methylpyrrolidone (NMP) and cast to manufacture a polymer electrolyte membrane.

The ionic conductivity and methanol crossover were respectively measured for the polymer electrolyte membrane manufactured in Example 5 and a polymer membrane in which solid acid was not included. The results are illustrated in Table 1.

TABLE 1

| | Ionic conductivity (S/cm) | Methanol crossover ($cm^2$/sec) |
|---|---|---|
| Polymer membrane | $2.60 \times 10^{-6}$ | $2.73 \times 10^{-9}$ |
| Example 5 | $5.18 \times 10^{-4}$ (after 20 minutes) $2.04 \times 10^{-4}$ (after 1 day) $4.40 \times 10^{-4}$ (after 2 days) | $5.09 \times 10^{-8}$ |

As illustrated in Table 1, by adding the dendrimer solid acid according to an embodiment of the present invention, the methanol crossover is slightly increased and the ionic conductivity is increased much more than the methanol crossover. Therefore, when the solid acid according to an embodiment of the present invention is used, ionic conductivity may be greatly improved without significantly affecting methanol crossover.

Example 6 and Example 7

Polymer electrolyte membranes were manufactured in the same manner as in Example 5, except that 5 parts by weight and 15 parts by weight of the dendrimer solid acid in Formula 23 were respectively used. The ionic conductivity and methanol crossover of the polymer electrolyte membranes were measured one day after the polymer electrolyte membranes were manufactured, and the results are shown in Table 2.

TABLE 2

|  | Ionic conductivity (S/cm) | Methanol crossover (cm²/sec) |
| --- | --- | --- |
| Example 5 | $2.04 \times 10^{-4}$ | $5.09 \times 10^{-8}$ |
| Example 6 | $1.84 \times 10^{-5}$ | $8.73 \times 10^{-9}$ |
| Example 7 | $1.02 \times 10^{-4}$ | $1.56 \times 10^{-8}$ |

As illustrated in Table 2, as the amount of the dendrimer solid acid increases, ionic conductivity improves. The methanol crossover also increases, however, the ion conductivity increases much more.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte membrane comprising:
a dendrimer solid acid of the following formula and $_3$H, —COOH, —OH, and —OPO(OH)$_2$ at the terminal of a side chain, wherein the dendrimer solid acid is uniformly distributed through at least one polymer matrix:

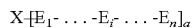

where X is a core represented by one of Formula 2 through Formula 17:

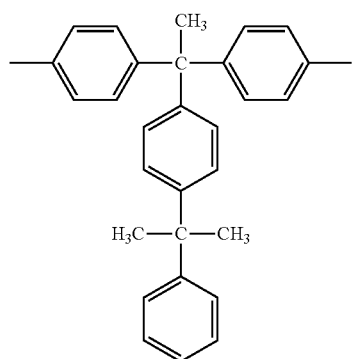

Formula 2

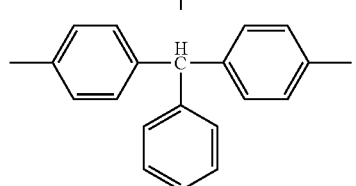

Formula 3

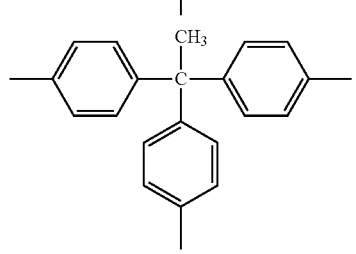

Formula 4

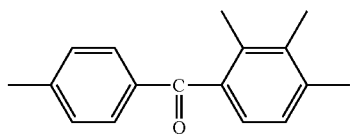

Formula 5

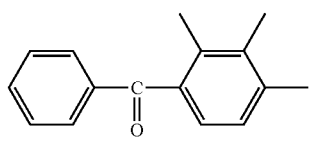

Formula 6

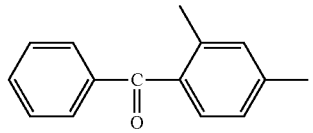

Formula 7

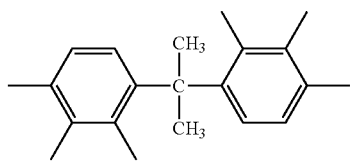

Formula 8

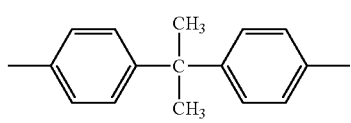

Formula 9

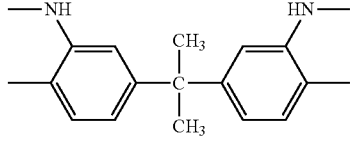

Formula 10

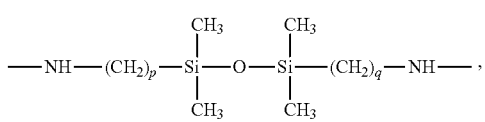

Formula 11 where each of p and q is independently an integer from 1 to 9,

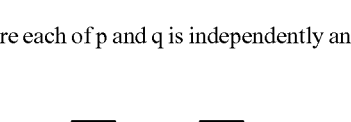

Formula 12

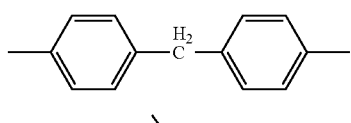

Formula 13

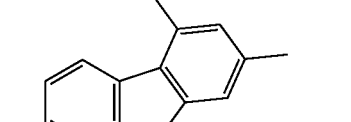

Formula 14

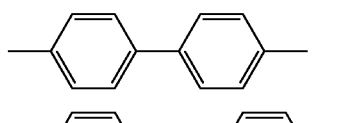

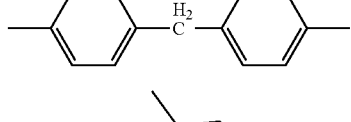

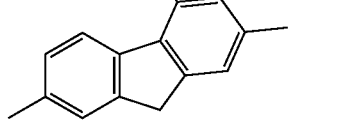

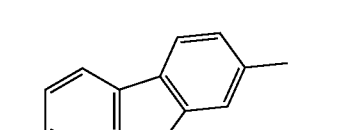

Formula 15

Formula 16

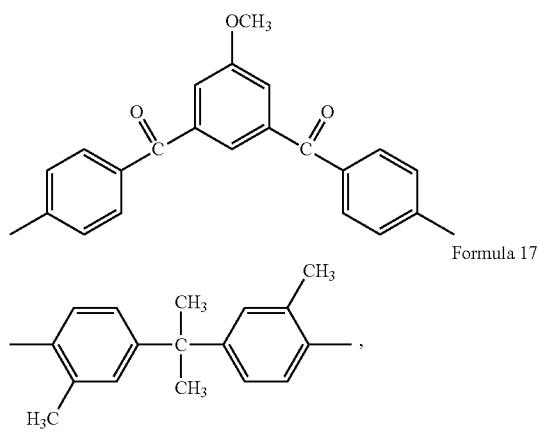

Formula 17 where a is an integer from 1 to 6 corresponding to the number of bonding sites of X, n is an integer from 2 to 6 corresponding to the number of generations of branching units of the dendrimer, each of $E_1$ through $E_{n-1}$ is independently selected from the organic groups represented by Formula 18 through Formula 22:

Formula 18

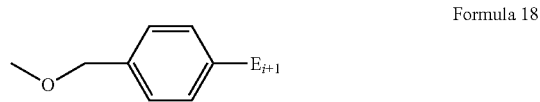

Formula 19
Formula 20
Formula 21
Formula 22

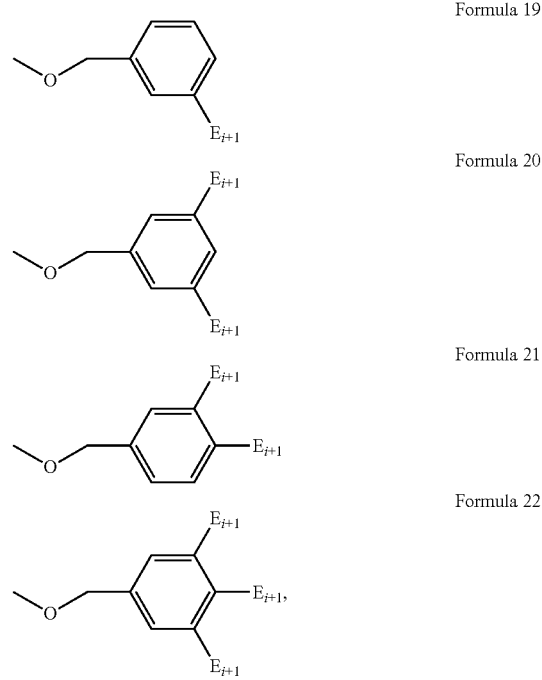

and $E_n$ is H, —OH, —COOH, —SO$_3$H, or —OPO(OH)$_2$.

2. The polymer electrolyte membrane of claim 1, wherein the dendrimer is a compound selected from the group consisting of compounds of Formula 23 through Formula 26:

Formula 23

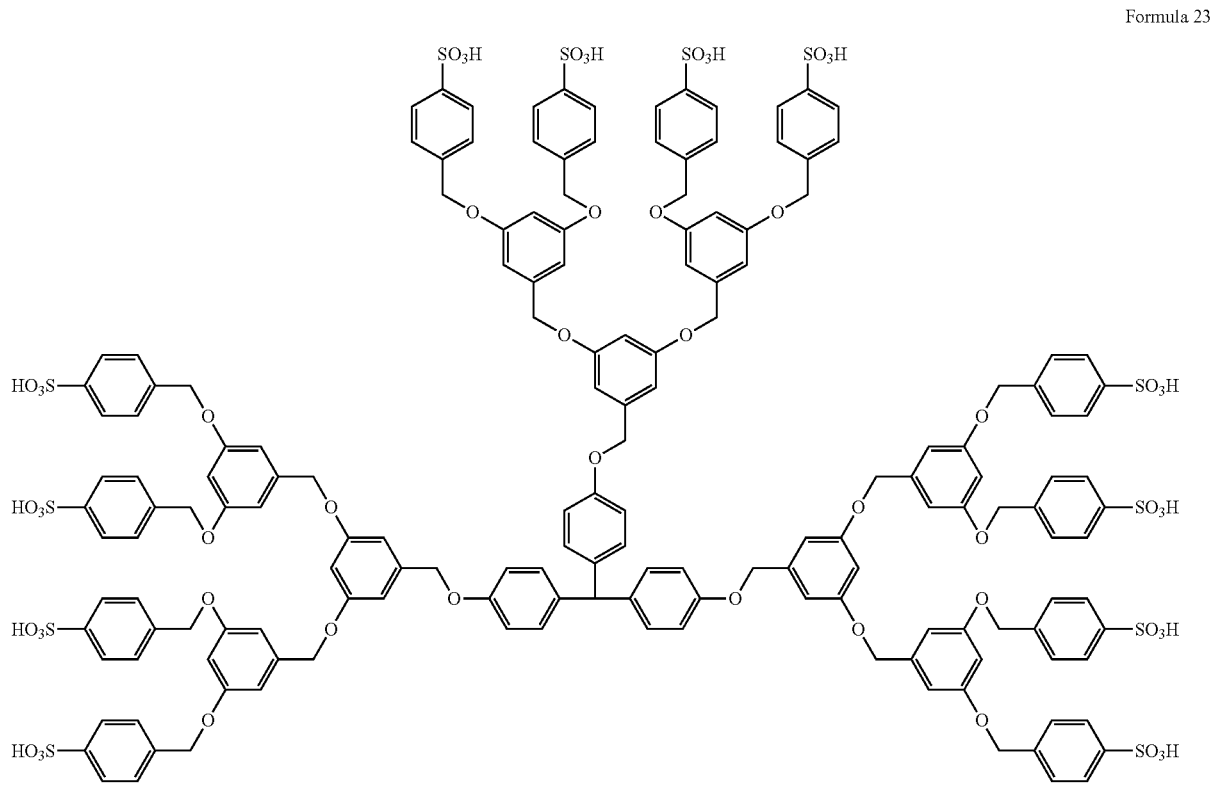

-continued
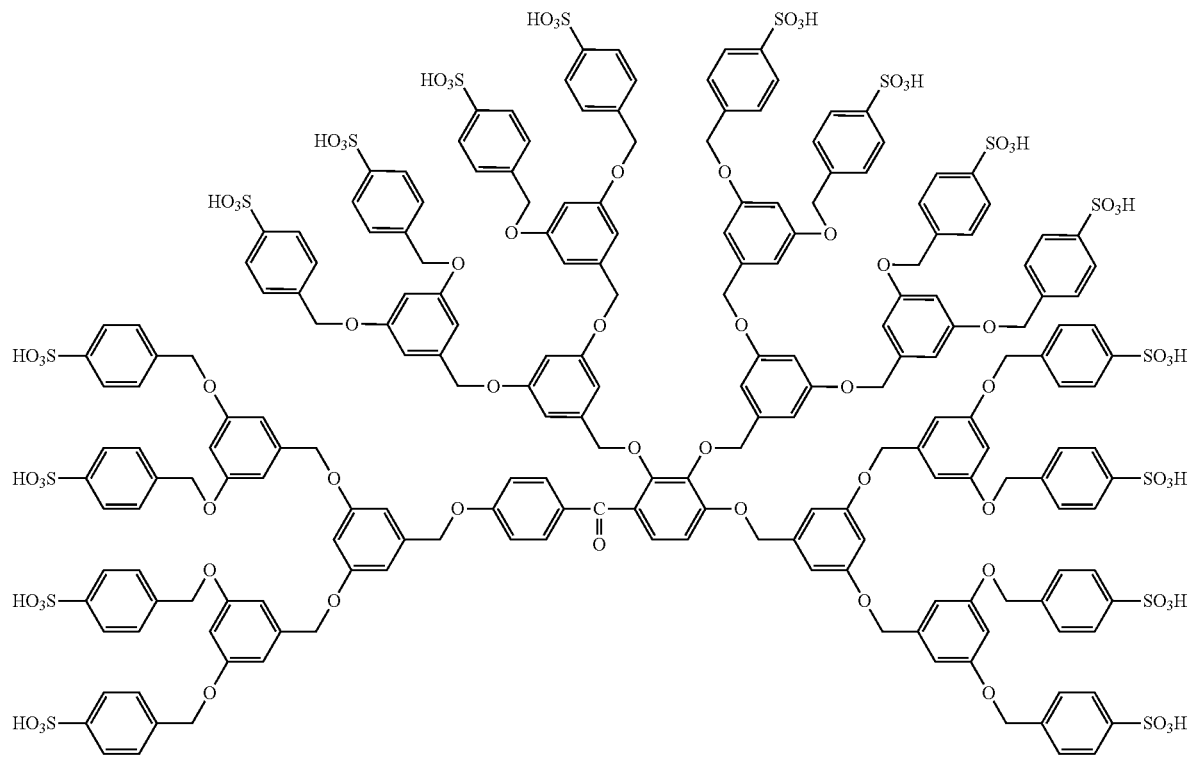
Formula 24
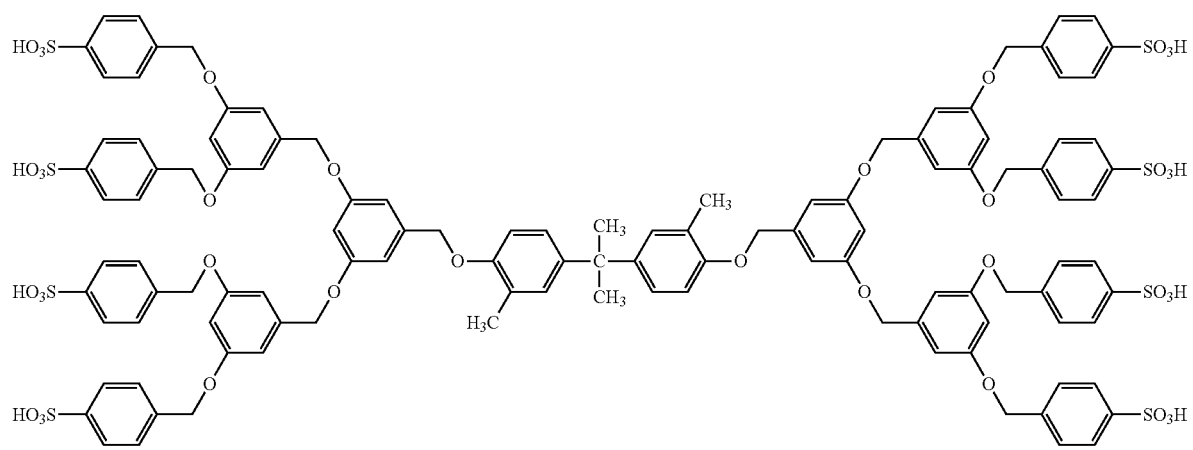
Formula 25

Formula 26

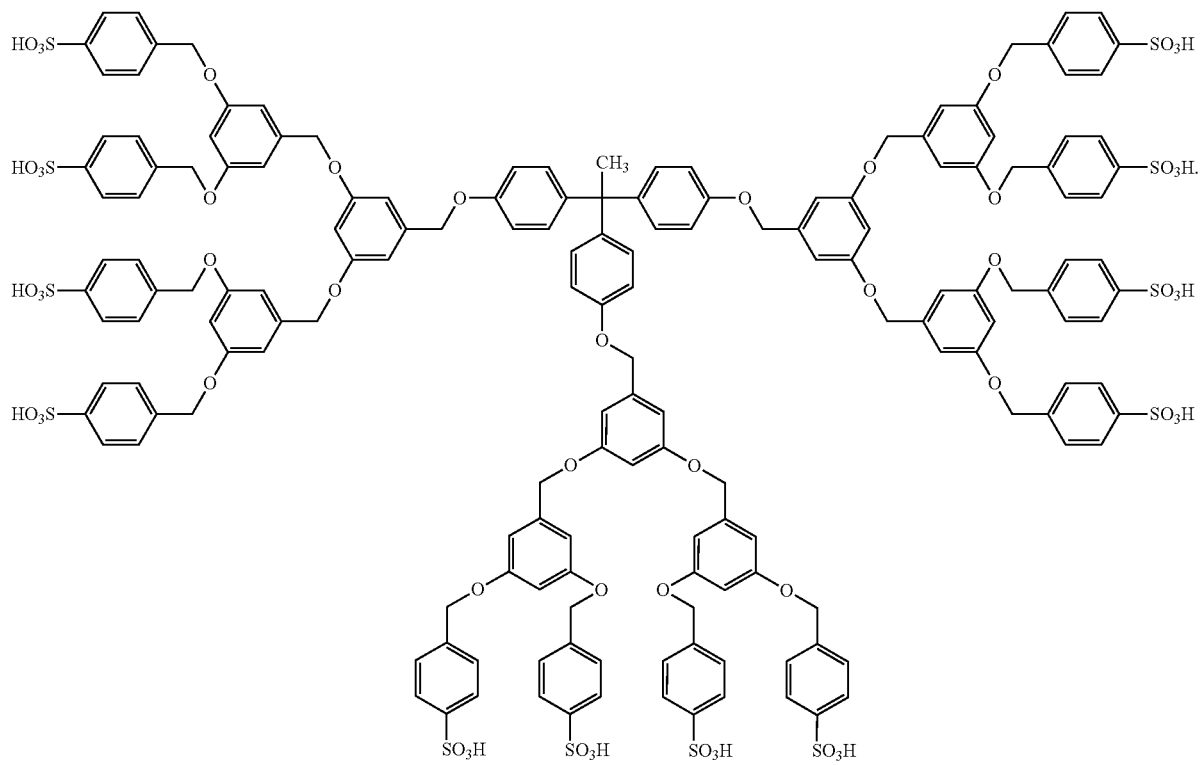

3. The polymer electrolyte membrane of claim 1, wherein the polymer matrix is at least one polymer material selected from the group consisting of polyimide, polybenzimidazole, polyethersulfone, and polyether-ether-ketone.

4. The polymer electrolyte membrane of claim 1, wherein the polymer matrix is a polymer resin represented by Formula 27:

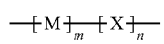
Formula 27 where M is a repeating unit of Formula 28:

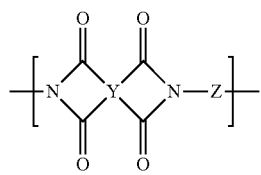
Formula 28 where Y is a tetravalent aromatic organic group or aliphatic organic group, and Z is a bivalent aromatic organic group or aliphatic organic group; and X of Formula 27 is a repeating unit of Formula 29:

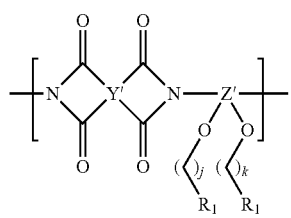
Formula 29 where Y' is a tetravalent aromatic organic group or aliphatic organic group, Z' is a tetravalent aromatic organic group or aliphatic organic group, each of j and k is independently an integer from 1 to 6, and $R_1$ is one of —OH, —$SO_3H$, —COOH, and —OPO(OH)$_2$; each of m and n is independently from 30 to 5000; and the ratio of m to n is from 2:8 to 8:2.

5. A Membrane Electrode Assembly (MEA) comprising:
the polymer electrolyte membrane of claim 1;
a cathode on a first side of the polymer electrolyte membrane comprising a catalyst layer and a diffusion layer; and
an anode on a second side of the polymer electrolyte membrane comprising a catalyst layer and a diffusion layer.

6. The Membrane Electrode Assembly (MEA) of claim 5, wherein the polymer matrix of the polymer electrolyte membrane comprises at least one polymer material selected from the group consisting of polyimide, polybenzimidazole, polyethersulfone, and polyether-ether-ketone.

7. The Membrane Electrode Assembly (MEA) of claim 5, wherein the polymer matrix of the polymer electrolyte membrane comprises a polymer resin represented by Formula 27:

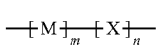
Formula 27 where M is a repeating unit of Formula 28:

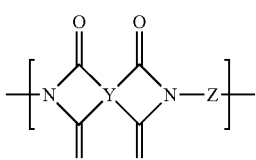
Formula 28 where Y is a tetravalent aromatic organic group or aliphatic organic group, and Z is a bivalent aromatic organic group or aliphatic organic group; and X of Formula 27 is a repeating unit of Formula 29:

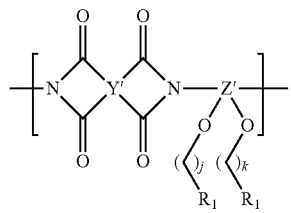
Formula 29 where Y' is a tetravalent aromatic organic group or aliphatic organic group, Z' is a tetravalent aromatic organic group or aliphatic organic group, each of j and k is independently an integer from 1 to 6, and $R_1$ is one of —OH, —$SO_3H$, —COOH, and —OPO(OH)$_2$; each of m and n is independently from 30 to 5000; and the ratio of m to n is from 2:8 to 8:2.

8. A fuel cell comprising:
the polymer electrolyte membrane of claim 1;
a cathode on a first side of the polymer electrolyte membrane comprising a catalyst layer and a diffusion layer;
an anode on a second side of the polymer electrolyte membrane comprising a catalyst layer and a diffusion layer;
a first separator adjacent the cathode; and
a second separator adjacent the anode.

9. The fuel cell of claim 8, wherein the polymer matrix of the polymer electrolyte membrane comprises at least one polymer material selected from the group consisting of polyimide, polybenzimidazole, polyethersulfone, and polyetherether-ketone.

10. The fuel cell of claim 8, wherein the polymer matrix of the polymer electrolyte membrane comprises a polymer resin represented by Formula 27:

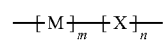
Formula 27 where M is a repeating unit of Formula 28:

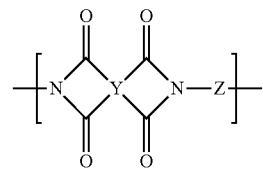
Formula 28 where Y is a tetravalent aromatic organic group or aliphatic organic group, and Z is a bivalent aromatic organic group or aliphatic organic group; and X of Formula 27 is a repeating unit of Formula 29:

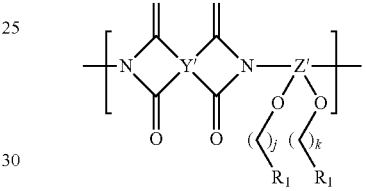
Formula 29 where Y' is a tetravalent aromatic organic group or aliphatic organic group, Z' is a tetravalent aromatic organic group or aliphatic organic group, each of j and k is independently an integer from 1 to 6, and $R_1$ is one of —OH, —$SO_3H$, —COOH, and —OPO(OH)$_2$; each of m and n is independently from 30 to 5000; and the ratio of m to n is from 2:8 to 8:2.

* * * * *